United States Patent [19]

Kanazawa

[11] Patent Number: 5,370,485

[45] Date of Patent: Dec. 6, 1994

[54] COUPLING APPARATUS

[76] Inventor: Hideki Kanazawa, 880 Sekishi-cho, Hamamatsu-shi, Shizuoka, 431-31, Japan

[21] Appl. No.: 22,465

[22] Filed: Feb. 25, 1993

[30] Foreign Application Priority Data

Feb. 28, 1992 [JP] Japan .................................. 4-042506

[51] Int. Cl.$^5$ ............................................. F16B 13/06
[52] U.S. Cl. .......................................... 411/55; 411/60
[58] Field of Search ................. 411/44, 57, 55, 60, 411/61, 54, 173

[56] References Cited

U.S. PATENT DOCUMENTS

| | | | |
|---|---|---|---|
| 3,973,789 | 8/1976 | Kunz et al. | 411/55 X |
| 4,560,311 | 12/1985 | Herb et al. | 411/54 X |
| 4,560,312 | 12/1985 | Grady | 411/55 |
| 5,284,409 | 2/1994 | Miyanaga | 411/55 |

Primary Examiner—Neill R. Wilson
Attorney, Agent, or Firm—Oblon, Spivak, McClelland, Maier & Neustadt

[57] ABSTRACT

A body member having a first fastener therein and a cover having a through hole therein removably secured by a screw member. The screw member has a head at one end, a body portion and means for engaging the said first fastener. The outer diameter of the body portion is less than the outer diameter of the head and the outer diameter of the head is slightly less than the inner diameter of the through hole. An engaging member composed of an elastic body is mounted on the body portion. The engaging member has a free diameter less than the inner diameter of the through hole. When the screw member is partially screwed into the first fastener on the body member, the cover will pass over the screw member and can be secured to the body member by tightening the screw member. As the screw member is tightened, the engaging member expands in the radius direction and engages the outer circumferential edge or the circumferential inner wall of the through hole. The screw member has an engaging section which has an outer diameter less than the inner diameter of the through hole but larger than the inner diameter of the engaging member which prevents the engaging member from dropping off the screw member.

4 Claims, 3 Drawing Sheets

COUPLING APPARATUS

BACKGROUND OF THE INVENTION

1. Field of the Invention

The present invention relates to a structure to fix a member to be fixed (e.g., a cover, nameplate, etc.) to a fixing member (e.g., a machine body, etc.) by using fasteners such as screw members and associated engaging members.

2. Description of the Prior Art

Conventionally, a cover (member to be fixed) to shield an opening in a body is attached to the edges of the body defining the opening. The opening may be provided in the body for maintenance of an electrical distribution panel, machine, etc. The cover has screws (screw members) inserted in a plurality of installation holes provided at the outer circumferential edge thereof, and the male thread of the screws is screwed into the female thread provided at the edges of the circumference of the opening of the body (fixing member) of the above object; the cover surface is pressed with the head of the screws, thereby causing the cover to be attached to the body and covering the opening.

Hence, the inner diameter of the installation holes for the screws formed in the cover is larger than the outer diameter of the male threaded portion of a screw. In addition, the inner diameter of the installation holes is usually formed to be smaller than the outer diameter of the heads of the screws. For this reason in order to carry out maintenance, in the case where the cover is removed from the opening of the machine, it is impossible to remove the cover unless the screws are completely removed from the female threads.

Therefore, it is cumbersome to attach and detach the cover, and moreover there will be a possibility for the screws, once removed from the female threads, to be lost.

In order to overcome such disadvantages as described above, the Japanese Laid-Open patent No. SHO-63-1999908 Gazette proposed a fixing or securing structure briefly described below.

In the fixing or securing structure mentioned in the above Gazette, it is proposed that the cover (member to be fixed) is fixed or secured to a body (fixing member) by expanding a ring-like engaging member, composed of an elastic body and mounted on a screw member, in the radius direction in line with the movement of the screw member in the screw-in direction with respect to the body (fixing member) and thereby pressing the engaging member against the outer circumferential edge or inner circumferential wall of a through hole in the cover (member to be fixed).

Therefore, in the fixing or securing structure according to the above-mentioned construction, a cover which is one of the examples for a member to be fixed, can be removed from the body of a piece of equipment, without removing a screw, which is one of the examples of screw members, from the body of the piece of equipment, for example, whenever carrying out maintenance. Therefore, convenience in the maintenance procedures can be remarkably improved.

Hence, since in the conventional fixing or securing structures mentioned above the engaging member is formed to be separate from the screw member and can be separated therefrom, there will be a possibility for the engaging member to be lost from the screw member in transportation and before attaching.

SUMMARY OF THE INVENTION

Therefore, the present invention has been developed to overcome the above-mentioned disadvantages, and it is an object of the invention to provide a fixing or securing structure for a cover (member to be fixed), in which both a screw member and engaging member are formed to be integral thereby having good handling efficiency to prevent them from being separated and one or the other lost.

In order to achieve the above object, the gist of the means which is employed by the present invention is a fixing or securing structure for attaching a cover (member to be fixed) to a body. It is characterized in that the fixing or securing structure includes an engaging member composed of an elastic body. The engaging member has a free outer diameter roughly equal to or less than the inner diameter of a through hole in the cover (member to be fixed). The engaging member engages with the head of the screw member and is thereby expanded in the radius direction in line with the movement of the screw member in the screw-in direction with respect to the body (fixing member). The expanded engaging member contacts the outer circumferential edge or inner circumferential wall of the through hole of the cover (member to be fixed). The cover (member to be fixed) is provided with a through hole of which the inner diameter is larger than the outer diameter of the head of the screw member and is fixed or secured to a body (fixing member) by the screw member and associated engaging member. A washer (supporting member) having its outer diameter smaller than the inner diameter of the through hole of the cover (member to be fixed) and larger than the free inner diameter of the engaging member is arranged on a guide section of the screw member below the head of the screw member. A caulking section on the screw member below the guide section is engaged with the inner circumferential edge of the washer to prevent the washer from dropping off or being separated from the screw member.

Furthermore, in order to accomplish the above object, the gist of another means which is employed in the present invention is also a fixing or securing structure for attaching a cover (member to be fixed) to a body (fixing member). It includes an engaging member composed of an elastic body and mounted on a screw member. The engaging member has a free outer diameter roughly equal to or less than the inner diameter of the through hole of the cover (member to be fixed). The engaging member engages with the head of the screw member and is thereby expanded in the radius direction in line with the movement of the screw member in the screw-in direction for the body (fixing member). The expanded engaging member contacts the outer circumferential edge or inner circumferential wall of the through hole of the cover (member to be fixed). The cover (member to be fixed) is provided with a through hole of which the inner diameter is larger than the outer diameter of the head of the screw member and is fixed or secured to the body (fixing member) by the screw member and associated engaging member. A supporting section, which is engageable with the above engaging member, with an outer diameter smaller than the inner diameter of the through hole of the cover (member to be fixed) and larger than the free inner diameter of the engaging member is arranged on the screw member below the head thereof and prevents the engaging member from dropping off or being separated from the screw member.

In the fixing or securing structure according to the above construction, the action is as follows: the engaging member is held between the head of the screw member and the washer (supporting member) or the supporting section even when the screw member is separated from the body (fixing member).

The fixing or securing structure for a cover (member to be fixed), which complies with the present invention, is composed as described above. Therefore, in the case where the fixing or securing structure is applied to, for example, a cover to be installed over the opening of a machine or an installation means such as nameplates, etc., it is easy to attach the cover to and detach it from the opening of the machine. Furthermore, there will be no case where screw members and associated engaging members will be lost in the attaching and detaching of the cover, etc. Still furthermore, the disadvantage of losing the engaging member can be avoided even under the situation where the screw member is removed from the body. Accordingly, the handling convenience of the above screw member and engaging member is further improved.

DETAILED DESCRIPTION OF THE PREFERRED EMBODIMENTS

With reference to the drawings attached herewith, some preferred embodiments of the present invention are described for the purpose of understanding the present invention. The following preferred embodiments are only examples in which the present invention is embodied, and they are not of such a character that they limit the scope of its technical applications.

Figure 1:
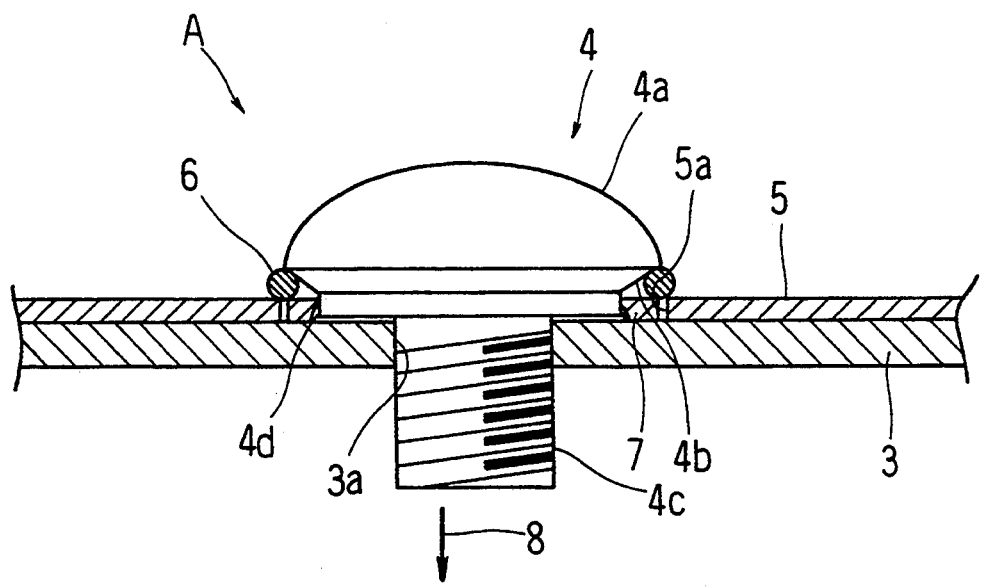
FIG. 1 a sectional view showing a fixing or securing structure for a member to be fixed, e.g., a cover, nameplate, etc., according to a preferred embodiment of the present invention.
Figure 2:
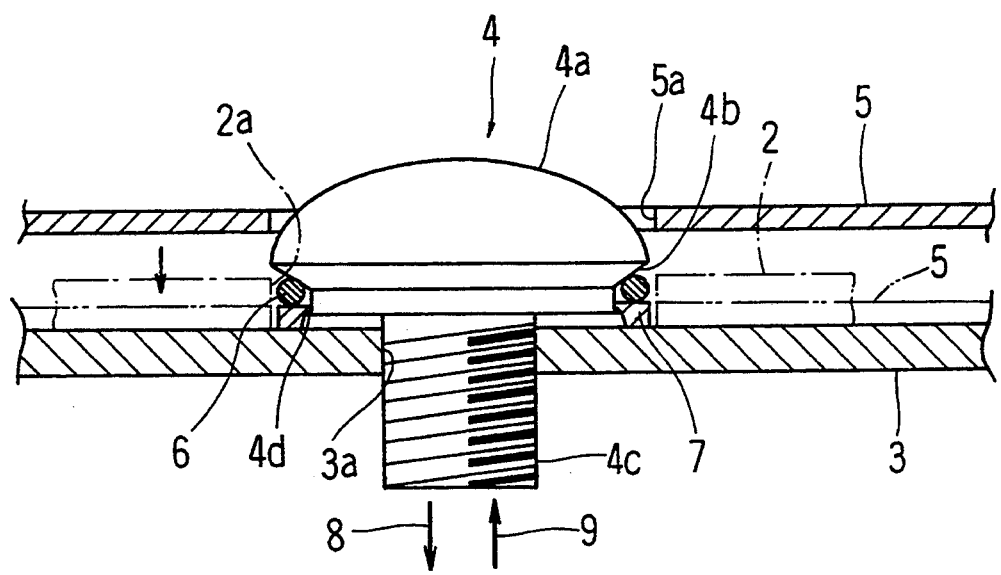
FIG. 2 is a descriptive view showing the procedure for fixing or securing a cover to, for example, a machine body with the fixing structure of FIG. 1.
Figure 3:
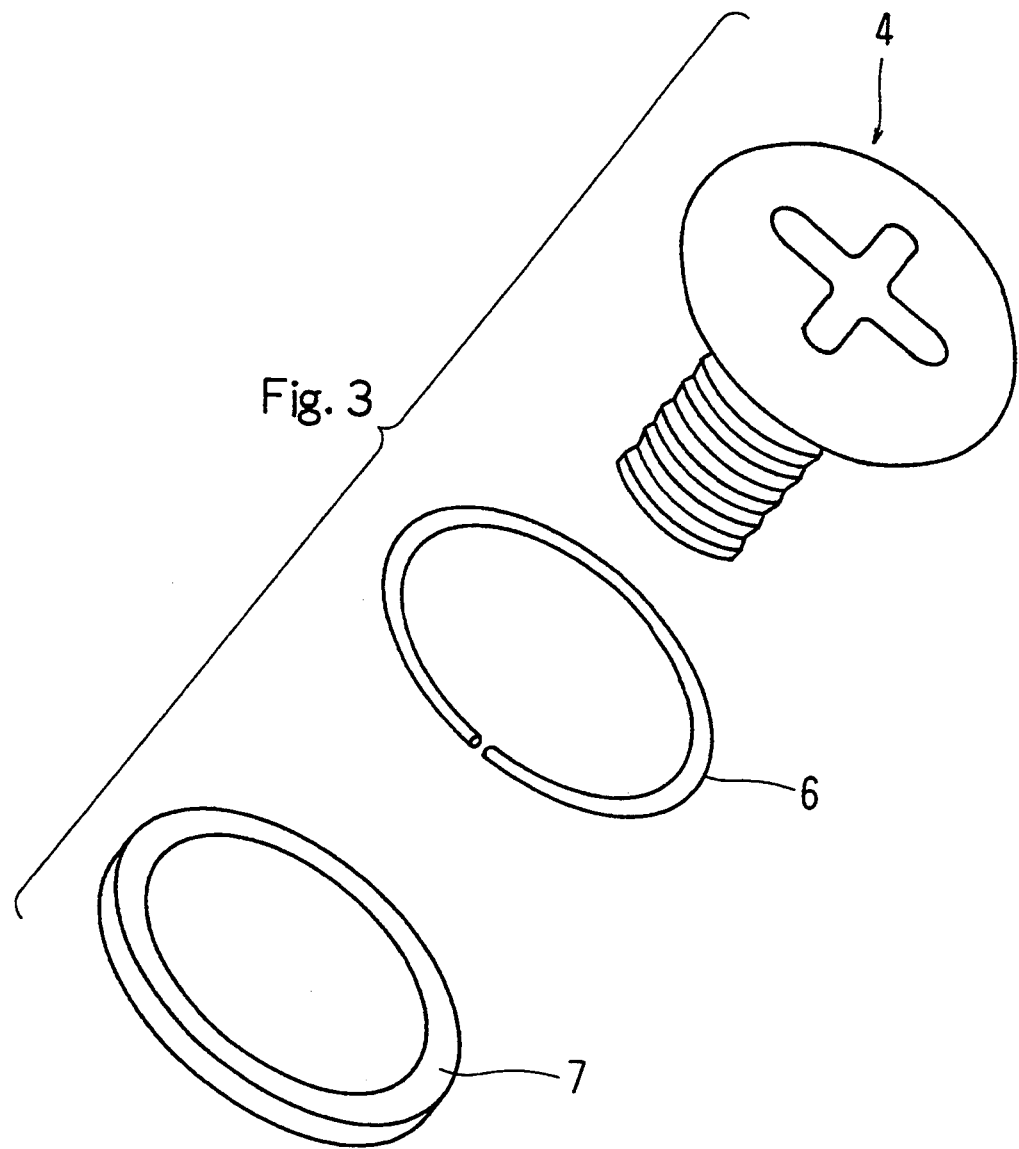
FIG. 3 is a perspective view showing a disassembled state of a screw member, an engaging member and a supporting member, which are components used to compose the above fixing or securing structure.

In the fixing structure "A" according to the preferred embodiment, a screw 4 (screw member) is screwed in the female thread 3a provided on the circumference of an opening, not illustrated, of, for example, a machine body 3 (fixing member) as shown in FIGS. 1, 2 and 3. A cover 5 (member to be fixed) to shield the above opening is provided with a through hole 5a of which the inner diameter is larger than the outer diameter of the head 4a of the screw 4. Furthermore, an engaging member 6 is composed of an elastic body which can be expanded in the radius direction, and has a free outer diameter which is roughly equal to or less than the inner diameter of the through hole 5a of the cover 5. Therefore, in the case where the cover 5 is fixed to the above machine body 3, the engaging member 6 is engaged with the head 4a of the screw 4 and is expanded in the radius direction in line with the movements of the screw 4 in the screw-in direction (the direction of the arrow 8) for the machine body 3. And the cover 5 is fixed to the machine body 3 by engagement of the above engaging member 6 with the outer circumferential edge of the through hole 5a of the cover 5.

A guide section 4b which is in contact with the inner circumferential face of the above engaging member 6 and has an inclined face to push, widen and expand the engaging member 6 in the radius direction in line with the movements of the screw 4 in the direction of the arrow 8, is formed on the outer circumferential edge of the lower side of the head 4a of the above screw 4. Furthermore, a male thread 4c to screw into the female thread 3a of the machine body 3 is formed at the central section of the lower side of the head 4a.

Then, a washer 7 (supporting member), which has the same thickness as that of the cover 5, an outer diameter smaller than the inner diameter of the through hole 5a and larger than the free inner diameter of the engaging member 6, and maintains the engaging member 6 in contact with the guide section 4b, is inserted on and fitted to the portion of the screw member below guide section 4b of the screw 4 which acts in the engaging member 6.

A caulking section 4d is formed downwards of the guide section 4b. The caulking section 4d is engaged with the inner circumferential edge of the washer 7 and acts to prevent the washer 7 from dropping or being separated from the corresponding screw 4.

The through hole 5a of the cover 5 is to pass the head 4a of the screw 4, the engaging member 6 and the washer 7 thereinto when attaching the cover 5 to and detaching it from the machine body 3.

The above engaging member 6 is molded to be like a ring, for example, an elastic metallic spring material of which the section is cylindrical, and is pushed and widened in the radius direction in line with the movement of the above screw 4 in the screw-in direction for the machine body 3. The lower side of the engaging member 6 is engaged with the outer circumferential edge at the upper side of the cover 5 of the through hole 5a, thereby causing the cover 5 to be fixed to the machine body 3.

The, procedure to compose the above fixing structure "A" is described with reference to FIG. 2.

With the screw 4 removed from the machine body 3, the engaging member 6 is held integrally between the head 4a of the screw 4 and the washer 7 in a way so that they are not separated from each other. Therefore, the engaging member 6 is not separated from the screw 4.

Before securing of the cover 5 on the machine body 3, the screw 4 is screwed into the female thread 3a of the machine body 3 by an operator, and the screwing action is stopped before the engaging member 6 is pushed and widened in the radius direction by means of the guide section 4b of the screw 4.

Next, the head 4a of the screw 4, the engaging member 6 and the washer 7 are inserted and passed through the through hole 5a of the cover 5, at the same time the under side of the cover 5 is brought into contact with the upper side of the machine body 3, and the above screw 4 is further screwed in the direction of the arrow 8.

As a result, the engaging member 6 is pushed and widened to expand in the radius direction by means of the guide section 4b of the screw 4. Accordingly, the under side of the engaging member 6 is engaged with the outer circumferential edge of the through hole 5a, thereby causing the cover 5 to be fixed to the machine body 3.

On the other hand, in the case where the cover 5, which has been fixed to the machine body 3 as just described above, is removed therefrom, the reversed procedure of the above is carried out, that is, the screw 4 is moved in the non screw-in direction (the direction of the arrow 9), and the engaging member 6 is contracted due to its own elasticity force in the radius direction, thereby causing the engagement of the under side of the engaging member 6 with the outer circumferential edge of the through hole 5a to be ended. As a result, it is possible to easily remove the cover 5 from the machine body 3 without the elimination of the screw 4 from the machine body 3.

Furthermore, it is one of the important elements that the above fixing or securing structure "A" is composed so that the engaging member 6 is pushed and widened in the radius direction in line with the movement of the screw 4 in the screw-in direction. However, for this reason, as shown in the above preferred embodiments, the shape of the guide section 4b of the screw 4 is not limited to only the inclined face, and the section of the engaging member 6 is not limited to only a cylindrical shape.

Therefore, for example, the section of the engaging member 6 may be square or rectangular. In the case that a cover 2 (shown with an one-dashed line in FIG. 2) having a larger dimension in thickness than the above cover 5 is used in the above preferred embodiment, the outer circumferential face of the engaging member 6, pushed and widened in the radius direction, is engaged with the inner circumferential wall 2a of the above cover 2.

Figure 4:
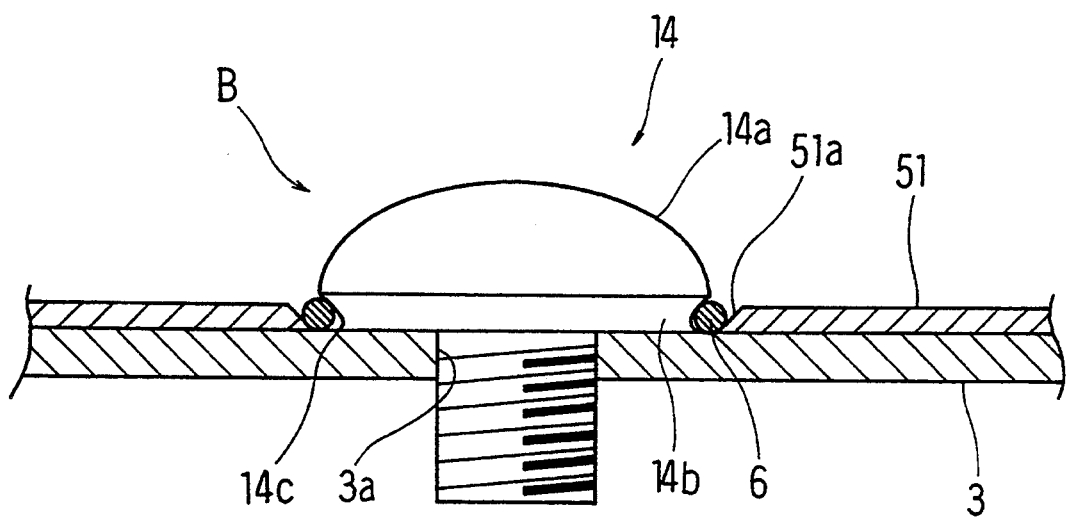
FIG. 4 is a sectional view showing a fixing or securing structure according to another preferred embodiment of the present invention.
Figure 5:
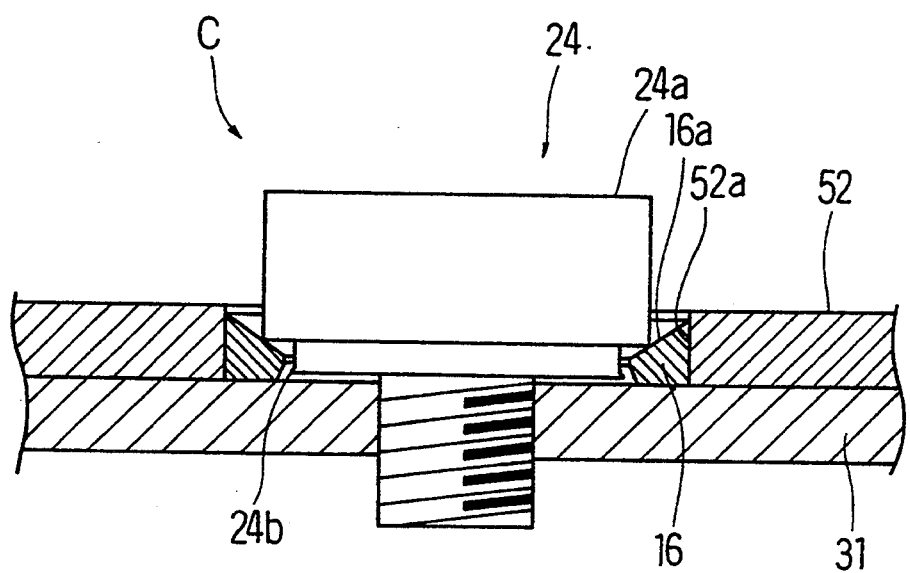
FIG. 5 is a sectional view showing a fixing or securing structure according to still another preferred embodiment of the present invention.

Next, the fixing or securing structures "B" and "C" according to other preferred embodiments of the present invention are described one after another with reference to FIGS. 4 and 5.

Firstly, in the fixing or securing structure "B" the inner circumferential wall of the through hole 51a of a cover 51 is formed to be tapered to ensure upward expansion as shown in FIG. 4. The engaging member 6 which is expanded in the radius direction in line with the movements of the screw 14 in the screw-in direction is engaged with the tapered inner circumferential wall or the outer circumferential edge of the through hole 51a, thereby causing the above cover 51 to be fixed to the machine body 3.

In this case, the guide section 14b of the head 14a is composed so that the lower end section 14c (supporting section) thereof has a smaller inner diameter than the inner diameter of the through hole 51a of the cover 51 and larger than the free inner diameter of the engaging member 6.

Thereby, after the screw 14 is removed from the machine body 3, the engaging member 6 can be prevented from dropping or being separated from the screw 14 by virtue of engaging the engaging member 6 with the lower end of the guide section 14b.

Next, in the fixing structure "C", an engaging member 16 having a tapered inner circumferential wall 16a, which is expanded upwards, is inserted in the through hole 52a of the cover 52 as shown in FIG. 5. The lower side outer circumferential edge of the head 24a of the screw 24, whose cross section is rectangular, comes in contact with the inner circumferential wall 16a of the engaging member 16. Therefore, the engaging member 16 is pushed and widened to expand in the radius direction in line with the movements of the above screw 24 in the screw-in direction. Then, the outer circumferential wall of the engaging member 16 is pressed and brought into contact with the inner circumferential wall of the through hole 52a of the cover 52, thereby causing the cover 52 to be fixed to the machine body 31.

Furthermore, a caulking section 24b (supporting section) which is engageable with the inner circumferential edge of the engaging member 16 which is of a reduced diameter, is formed downwards of the head 24a almost as functionally as in the case of the fixing structure "B".

Accordingly, in the screw 24 of the fixing structure "C", the engaging member 16 will be held between the head 24a and the caulking section 24b even under the situation that the screw 24 has been drawn out from the machine body 31, thereby causing the engaging member 16 to be prevented from dropping and being separated from the screw 24.

As described above, in the fixing structure "A" "B" v or "C" according each preferred embodiment, each screw and each engaging member are composed to be integral, thereby causing the missing or dropping of the engaging member to be effectively prevented and the handling efficiency thereof to be much improved.

In each of the above fixing structures, a description is given to the case where a screw is a screw member. However, it is possible to compose the above fixing or securing structures by using a nut to be screwed on a male thread installed to the machine body in place of the above described arrangement.

Still furthermore, a fixing or securing structure according to the present invention is preferably employed when attaching, for example, a nameplate a control panel, etc. as a member to be fixed, instead of the cover 2, 5, 51 or 52 in the above preferred embodiments.

What is claimed is:

1. Apparatus comprising:
   (a) a fixing member having a first fastener thereon;
   (b) a member to be fixed to said fixing member having a through hole therein adapted to be aligned with said first fastener;
   (c) a second fastener having a head at one end and a body portion extending away from said head and including means for engaging said second fastener with said first fastener, the outer diameter of said body portion being less than the outer diameter of said head and the outer diameter of said head being slightly less than the inner diameter of said through hole;
   (d) a ring shaped engaging member composed of an elastic body arranged on the body portion of said second fastener adjacent to said head, said engaging member having a free outer diameter roughly equal to or less than the inner diameter of said through hole and an inner diameter less than the outer diameter of said head, said engaging member cooperating with the head of said second fastener and being forced thereby to expand in the radius direction in line with the movement of said second fastener into engagement with said first fastener until said engaging member extends over and engages the outer circumferential edge of said through hole so that said engaging member wedges between said head of said second fastener and said member to be fixed to thereby secure said member to be fixed to said fixing member;

(d) a supporting member arranged on the body of said second fastener on the side of said engaging member away from said head, said supporting member having its outer diameter smaller than the inner diameter of said through hole and larger than the free inner diameter of said engaging member;

(f) an engaging section on said second fastener for engaging said supporting member to maintain said engaging member and said supporting member on said second fastener when said second fastener is disconnected from said first fastener;

(g) hereby said member to be fixed may be placed over the head of said second fastener while said second fastener is loosely secured to said first fastener and thereafter secured to said fixing member upon further tightening said second fastener into engagement with said first fastener, and said member to be fixed can be removed from said fixing member by loosening said second fastener with respect to said first fastener, to permit said engaging member to retract to its free outer diameter, without completely removing said second fastener from said first fastener.

2. Apparatus comprising:

(a) a fixing member having a first fastener thereon;

(b) a member to be fixed to said fixing member having a through hole therein adapted to be aligned with said first fastener;

(c) a second fastener having a head at one end and a body portion extending away from said head and including means for engaging said second fastener with said first fastener, the outer diameter of said body portion being less than the outer diameter of said head and the outer diameter of said head being slightly less than the inner diameter of said through hole;

(d) a ring shaped engaging member composed of an elastic body arranged on the body portion of said second fastener adjacent to said head, said engaging member having a free outer diameter roughly equal to or less than the inner diameter of said through hole and an inner diameter less than the outer diameter of said head, said engaging member cooperating with the head of said second fastener and being forced thereby to expand in the radius direction in line with the movement of said second fastener into engagement with said first fastener until said engaging member engages the inner circumferential all edge of said through hole so that said engaging member wedges between said head of said second fastener and said member to be fixed to thereby secure said member to be fixed to said fixing member;

(e) a supporting member arranged on the body of said second fastener on the side of said engaging member away from said head, said supporting member having its outer diameter smaller than the inner diameter of said through hole and larger than the free inner diameter of said engaging member;

(f) an engaging section on said second fastener for engaging said supporting member to maintain said engaging member and said supporting member on said second fastener when said second fastener is disconnected from said first fastener;

(g) whereby said member to be fixed may be placed over the head of said second fastener while said second fastener is loosely secured to said first fastener and thereafter secured to said fixing member upon further tightening said second fastener into engagement with said first fastener, and said member to be fixed can be removed from said fixing member by loosening said second fastener with respect to said first fastener, to permit said engaging member to retract to its free outer diameter, without completely removing said second fastener from said first fastener.

3. Apparatus comprising:

(a) a fixing member having a first fastener thereon;

(b) a member to be fixed to said fixing member having a through hole therein adapted to be aligned with said first fastener;

(c) a second fastener having a head at one end and a body portion extending away from said head and including means for engaging said second fastener with said first fastener, the outer diameter of said body portion being less than the outer diameter of said head and the outer diameter of said head being slightly less than the inner diameter of said through hole;

(d) a ring shaped engaging member composed of an elastic body arranged on the body portion of said second fastener adjacent to said head, said engaging member having a free outer diameter roughly equal to or less than the inner diameter of said through hole and an inner diameter less than the outer diameter of said head, said engaging member cooperating with the head of said second fastener and being forced thereby to expand in the radius direction in line with the movement of said second fastener into engagement with said first fastener until said engaging member extends over and engages the outer circumferential edge of said through hole so that said engaging member wedges between said head of said second fastener and said member to be fixed to thereby secure said member to be fixed to said fixing member;

(e) a supporting section provided on said second fastener for engaging said engaging member, said supporting section having an outer diameter smaller than the inner diameter of said through hole and larger than the free inner diameter of said engaging member thereby maintaining said engaging member on said second fastener when said second fastener is disconnected from said first fastener;

(f) whereby said member to be fixed may be placed over the head of said second fastener while said second fastener is loosely secured to said first fastener and thereafter secured to said fixing member upon further tightening said second fastener into engagement with said first fastener, and said member to be fixed can be removed from said fixing member by loosening said second fastener with respect to said first fastener, to permit said engaging member to retract to its free outer diameter, without completely removing said second fastener from said first fastener.

4. Apparatus comprising:

(a) a fixing member having a first fastener thereon;

(b) a member to be fixed to said fixing member having a through hole therein adapted to be aligned with said first fastener;

(c) a second fastener having a head at one end and a body portion extending away from said head and including means for engaging said second fastener with said first fastener, the outer diameter of said body portion being less than the outer diameter of said head and the outer diameter of said head being slightly less than the inner diameter of said through hole;

(d) a ring shaped engaging member composed of an elastic body arranged on the body portion of said second fastener adjacent to said engaging member having a free outer diameter roughly equal to or less than the inner diameter of said through hole and an inner diameter less than the outer diameter of said head, said engaging member cooperating with the head of said second fastener and being forced thereby to expand in the radius direction in line with the movement of said second fastener into engagement with said first fastener until said engaging member engages the inner circumferential wall of said through hole so that said engaging member wedges between said head of said second fastener and said member to be fixed to thereby secure said member to be fixed to said fixing member;

(e) a supporting section provided on said second fastener for engaging said engaging member, said supporting section having an outer diameter smaller than the inner diameter of said through hole and larger than the free inner diameter of said engaging member thereby maintaining said engaging member on said second fastener when said second fastener is disconnected from said first fastener;

(f) whereby said member to be fixed may be placed over the head of said second fastener while said second fastener is loosely secured to said first fastener and thereafter secured to sad fixing member upon further tightening said second fastener into engagement with said first fastener, and said member to be fixed can be removed from said fixing member by loosening said second fastener with respect to said first fastener, to permit said engaging member to retract to its free outer diameter, without completely removing said second fastener from said first fastener.

* * * * *